United States Patent
Pello et al.

(10) Patent No.: US 9,368,151 B2
(45) Date of Patent: Jun. 14, 2016

(54) SYSTEMS AND METHODS FOR CHRONOLOGICALLY ORDERING DIGITAL MEDIA AND APPROXIMATING A TIMELINE OF AN EVENT

(71) Applicant: Evergig Music S.A.S.U., Paris (FR)

(72) Inventors: Hippolyte Pello, Paris (FR); Nicolas Lapomarda, Paris (FR)

(73) Assignee: Evergig Music S.A.S.U., Paris (FR)

( * ) Notice: Subject to any disclaimer, the term of this patent is extended or adjusted under 35 U.S.C. 154(b) by 0 days.

(21) Appl. No.: 14/697,924

(22) Filed: Apr. 28, 2015

(65) Prior Publication Data

US 2015/0310891 A1 Oct. 29, 2015

Related U.S. Application Data

(60) Provisional application No. 61/985,611, filed on Apr. 29, 2014.

(51) Int. Cl.

| | |
|---|---|
| *G11B 20/10* | (2006.01) |
| *G11B 27/10* | (2006.01) |
| *G11B 27/00* | (2006.01) |

(52) U.S. Cl.
CPC .... *G11B 20/10527* (2013.01); *G11B 20/10259* (2013.01); *G11B 20/10287* (2013.01); *G11B 27/10* (2013.01); *G11B 27/00* (2013.01); *G11B 2020/10592* (2013.01)

(58) Field of Classification Search
CPC ............ H04N 5/76; H04N 5/765; H04N 5/04; H04N 21/41415; H04N 21/485; H04N 9/8205; H04N 21/482; G11B 27/10; G11B 27/02; G11B 27/005; G11B 27/031; G11B 27/034; G11B 27/34; G11B 20/10259; G11B 20/10527; G11B 20/10287; G11B 27/00; G11B 20/10; G11B 2020/10592; G06F 17/30843; G06F 3/165

USPC ............ 369/30.19, 47.16; 386/280, 243, 241, 386/125, 126, 281, 300, 353
See application file for complete search history.

(56) References Cited

PUBLICATIONS

Moreno, Pedro J., et al.; "A Recursive Algorithm For The Forced Alignment Of Very Long Audio Segments," Cambridge Research Laboratory, Compaq Computer Corporation; 1998, Cambridge, Massachusetts.

(Continued)

*Primary Examiner* — Ali Neyzari
(74) *Attorney, Agent, or Firm* — Norris McLaughlin & Marcus, P.A.

(57) ABSTRACT

Systems and methods synchronize digital audio and/or video tracks recorded at a same event. The systems and methods access input digital audio tracks that are storable in a database, wherein the input digital audio tracks comprise a list of original recorded digital audio tracks from original recorded digital videos that were recorded from multiple digital sources at the same event. The systems and methods extract at least one feature from each digital audio track of the input digital audio tracks, and construct, based on the at least one feature, a peak map for each digital audio track of the input digital audio tracks. The systems and methods detect a match between at least two digital audio tracks by performing a cross-correlation of the peak maps of the digital audio tracks of the input digital audio tracks and/or estimate a delay between at least one pair of digital audio tracks of the input digital audio tracks, wherein the delay comprises a time difference between the at least one pair of digital audio tracks that received a maximum value in the cross-correlation of the peak maps. The systems and method create an output group comprising the at least two digital audio tracks and/or the at least one pair of digital audio tracks.

20 Claims, 4 Drawing Sheets

(56) References Cited

PUBLICATIONS

Yang, Cheng; "MACS: Music Audio Characteristic Sequence Indexing for Similarity Retrieval," Department of Computer Science, Stanford University; Oct. 2001, pp. W2001-1-W2001-4, New Peitz, New York.

Mueller, Meinard, et al.; "Audio Matching Via Chroma-Based Statistical Features," Universitaet Bonn, Institut fuer Informatik III; 2005, pp. 288-295, Bonn, Germany.

Wang, Avery Li-Chun; "An Industrial-Strength Audio Search Algorithm"; Shazam Entertainment, Ltd.; 2005, Palo Alto, California.

Vrajitoru, Dana, et al.; "Consistent Graph Layout for Weighted Graphs"; Intelligent Systems Laboratory, Indiana University; The 3rd ACS/IEEE International Conference on Computer Systems and Applications; 2005, South Bend, Indiana.

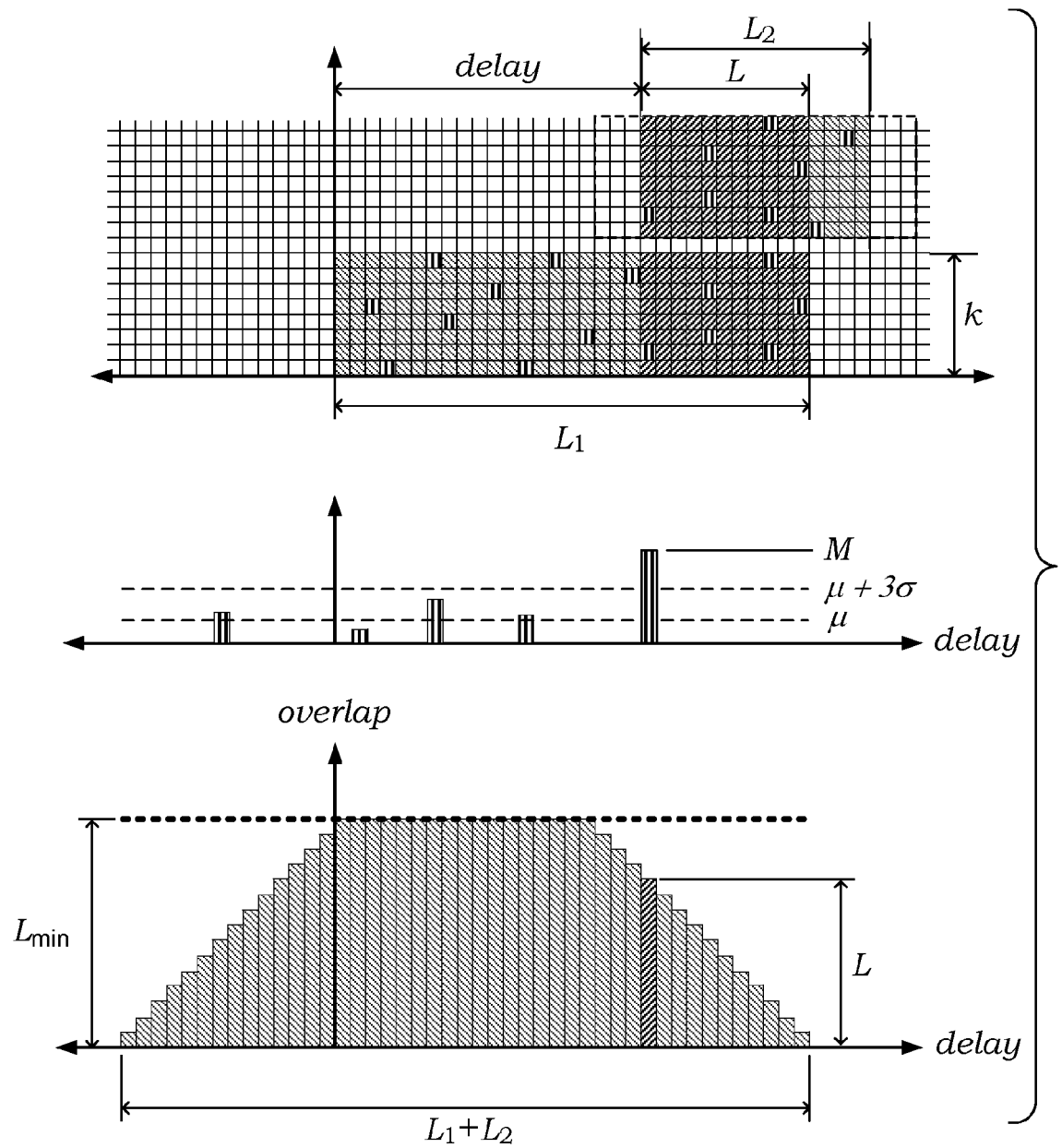
F I G. 2

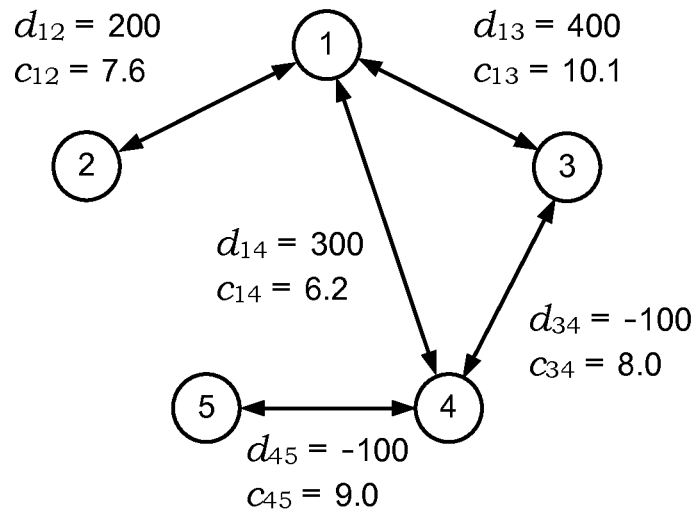
F I G. 3.
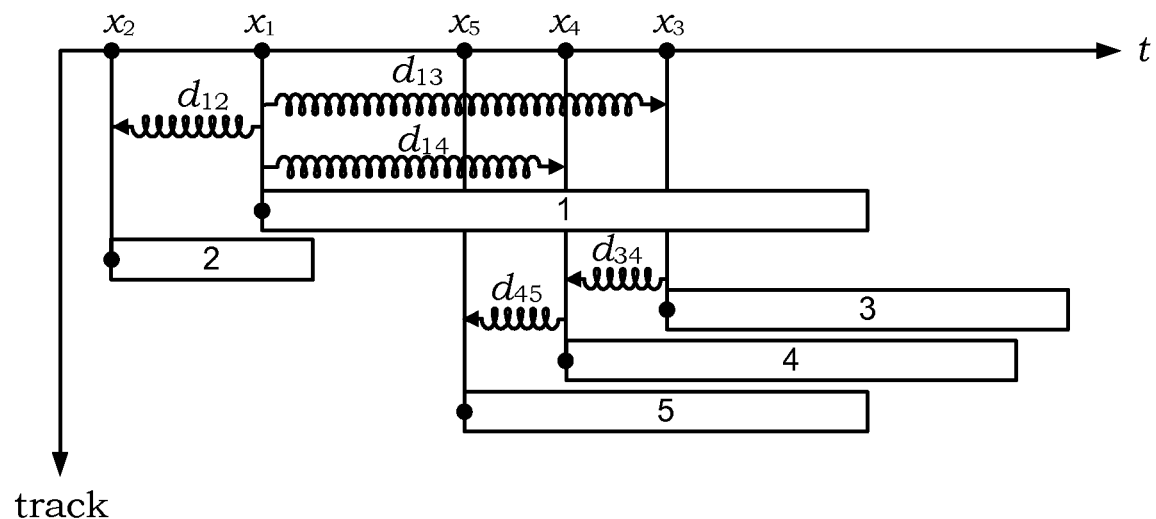
F I G. 4

SYSTEMS AND METHODS FOR CHRONOLOGICALLY ORDERING DIGITAL MEDIA AND APPROXIMATING A TIMELINE OF AN EVENT

CROSS REFERENCE TO RELATED APPLICATION

This application is a non-provisional application claiming the benefit under 35 U.S.C. 119(e) of U.S. Provisional Patent Application No. 61/985,611, filed on Apr. 29, 2014, which is incorporated herein by reference in its entirety.

FIELD OF DISCLOSURE

The systems and methods chronologically order digital media and approximate a timeline of an event that previously occurred. The digital media comprises digital audio and/or video tracks which are recorded digital audio and/or video tracks of one or more portions of said same event that previously occurred. The inventive systems and methods are configured or adapted to synchronize a plurality of audio and/or video files and/or tracks of said same event. The inventive systems and methods implement and/or execute one or more computer-implemented methods, computer algorithms and/ or computer software to synchronize the audio and/or video tracks and isolate one or more different portions of said same event.

To reconstruct an entire timeline of the same event and/or correctly place or position all audio and/or video tracks on the same time axis requires (i) to have at least one audio and/or video track at each time or moment during the entire same event, which is typically not available, and (ii) constructing a single group of audio and/or video tracks with a high confidence. Thus, the inventive systems and methods are configured and/or adapted to output at least one group of audio and/or video tracks, whereby each audio and/or video track of the at least one group has a given or assigned offset inside the at least one group of audio and/or video tracks. However, when grouping tracks together, edited videos may gather tracks of different portions of the same event and/or add inconsistencies in the timeline of the same event. Therefore, the inventive systems and methods are configured or adapted to restrict a match between audio and/or video tracks to an actual interval of time during the same event where both audio and/or video tracks are similar. Moreover, the inventive systems and methods further output zero or at least one group of chunks of the original recorded audio and/or video tracks, whereby each chunk has a given offset inside the group of chunks. In embodiments, the match may not be possible, such as, for example, when the inventive method utilizes match bounds and/or outputs the chunks of the original recorded audio and/or video tracks.

Original audio and/or video signals utilized by the inventive systems and methods are audio and/or video signals recorded by at least two different users recording the same or different portions of the same event with different digital mobile devices. As a result, the original audio and/or video signals are generated, created or recorded from multiple sources (i.e., the digital mobile devices of the at least two different users). The inventive systems and methods are configured or adapted to synchronize the original audio and/or video tracks from the multiple sources. However, as the at least two different users recording the same event are likely to film or record different portions of the same event, or from a different points of view, the recorded video signals are usually quite different. To the contrary, the recorded audio signals depend less on an orientation of the camera of the digital mobile devices and will present much more similarity in general. Thus, the inventive systems and methods for synchronizing the recorded audio and/or video signals are based on the recorded audio signals from the multiple sources.

BACKGROUND OF THE DISCLOSURE

Synchronization of several audio signals is quite a new subject, with little examples or applications so far. Moreno et al. (see P J Moreno, C F Joerg, J M Van Thong, and Oren Glickman, "A recursive algorithm for the forced alignment of very long audio segments," *ICSLP,* 1998) present a way to align very long audio files using speech recognition.

In the last few years there has been an interest for audio matching as set forth in Wang (see Avery Li-chun Wang, "An Industrial Strength Audio Search Algorithm," *ISMIR,* 2003), Müller et al. (see M Müller, Frank Kurth, and M Clausen, "Audio Matching via Chroma-Based Statistical Features," ISMIR, 2005) and Yang (see Cheng Yang. MACS: Music Audio Characteristic Sequence Indexing For Similarity Retrieval . . . *of Signal Processing to Audio and Acoustics,* 2001 . . . , (October):1-4, 2001). Mostly these techniques are designed for matching a track against a database of high quality files. To efficiently match audio files, tracks are summed up in fingerprints.

In Wang for example (algorithm used in Shazam music recognition service), the fingerprint consists in a sequence of hash values appearing at specific times in the signals. After searching for matches in the database, two signals are finally declared as matching if their hashes in common tend to be located at the same times in both files, with the second file or hash positioned at a specific delay from the first one.

SUMMARY OF THE DISCLOSURE

In embodiments, systems and methods may synchronize digital audio and/or video tracks recorded at a same event. The systems and methods may access input digital audio tracks that are storable in a database, wherein the input digital audio tracks comprise a list of original recorded digital audio tracks from original recorded digital videos that were recorded from multiple digital sources at the same event. Further, the systems and methods may extract at least one feature from each digital audio track of the input digital audio tracks, and construct, based on the at least one feature, a peak map for each digital audio track of the input digital audio tracks. Still further, the systems and methods may perform a cross-correlation of the peak maps of the digital audio tracks of the input digital audio tracks. Yet still further, the systems and methods may estimate a delay between at least one pair of digital audio tracks of the input digital audio tracks, wherein the delay comprises a time difference between the at least one pair of digital audio tracks that received a maximum value in the cross-correlation of the peak maps. Moreover, the systems and methods may create an output group comprising the at least one pair of digital audio tracks, wherein each digital audio tracks of the output group has an offset inside the output group.

In an embodiment, each digital audio tracks of the output group may be synchronized such that at least one portion of the same event is isolated by the output group.

In an embodiment, the systems and methods may provide a database, wherein the input digital audio tracks are stored within the database.

In an embodiment, the systems and methods may store the output group within a digital memory device.

In an embodiment, the output group may be a group of chunks of digital audio and/or video tracks, whereby each chunk has a given offset inside the group of chunks.

In an embodiment, each peak map may be constructed by searching each digital audio track for a local maxima to construct a binary spectrogram that equals 1 at a local maximum and 0 elsewhere.

In an embodiment, the systems and methods may determine the local maxima by utilizing a function imdilate, comprising an image and a mask, that determines a maximum value of a region around each pixel defined by the mask.

In an embodiment, the mask may be an elliptic mask

In embodiments, the systems and methods may access input digital audio tracks that are storable in a database, wherein the input digital audio tracks comprise a list of original recorded digital audio tracks from original recorded digital videos that were recorded from multiple digital sources at the same event. Further, the systems and methods may extract at least one feature from each digital audio track of the input digital audio tracks. Still further, the systems and methods may construct, based on the at least one feature, a peak map for each digital audio track of the input digital audio tracks, and detect a match between at least two digital audio tracks by performing a cross-correlation of the peak maps of the digital audio tracks of the input digital audio tracks. Yet still further, the systems and methods may compute a confidence value of the match and select at least one link between the at least two digital audio tracks of the match, wherein the at least one link comprises a confidence value above a predetermined confidence threshold. Moreover, the systems and methods may create an output group based on the at least one link, wherein at least two digital audio tracks belong to the output group if the at least one link exists between the at least two digital audio tracks.

In an embodiment, the at least two digital audio tracks of the output group may be synchronized such that at least one portion of the same event is isolated by the output group.

In an embodiment, the systems and methods provide a database, wherein the input digital audio tracks are stored within the database.

In an embodiment, the systems and methods may store the output group within a digital memory device.

In an embodiment, the systems and methods may utilize equation (1) to compute the confidence of the match, wherein equation (1) may be confidence=M/M*, wherein M is a maximum value obtained during the cross-correlation and M* is an estimate representing an expected maximum of the cross-correlation if the at least two digital audio tracks of the match were decorrelated and the lengths of the at least two digital audio tracks of the match.

In an embodiment, the systems and methods may discard links between at least two digital audio tracks having a confidence value below the predetermined confidence threshold, wherein, optionally, the predetermined confidence threshold may be about 6.

In an embodiment, the systems and methods may detect a list of links between the digital audio tracks, wherein each link is defined (i) as a delay and a confidence when groups of digital audio tracks are outputted or (ii) a delay, a confidence and match bounds when groups of chunks of the digital audio tracks are outputted.

In embodiments, the systems and methods may comprise a non-transitory computer-readable medium with instructions stored thereon, that when executed by a microprocessor, perform a method for synchronizing digital audio and/or video tracks recorded at a same event. The systems and methods may access input digital audio tracks that are storable in a database, wherein the input digital audio tracks comprise a list of original recorded digital audio tracks from original recorded digital videos that were recorded from multiple digital sources at the same event. Further, the systems and methods may extract at least one feature from each digital audio track of the input digital audio tracks, and construct, based on the at least one feature, a peak map for each digital audio track of the input digital audio tracks. Still further, the systems and methods may detect a match between at least two digital audio tracks by performing a cross-correlation of the peak maps of the digital audio tracks of the input digital audio tracks and/or estimating a delay between at least one pair of digital audio tracks of the input digital audio tracks, wherein the delay comprises a time difference between the at least one pair of digital audio tracks that received a maximum value in the cross-correlation of the peak maps. Moreover, the systems and methods may create an output group comprising the at least two digital audio tracks and/or the at least one pair of digital audio tracks.

In an embodiment, the at least two digital audio tracks or the at least one pair of digital audio tracks of the output group may be synchronized such that at least one portion of the same event is isolated by the output group.

In an embodiment, the systems and methods may provide a database, wherein the input digital audio tracks are stored within the database.

In an embodiment, the systems and methods may store the output group within a digital memory device.

In an embodiment, the systems and methods may compute, after the match is detected, a confidence value of the match, select at least one link between the at least two digital audio tracks of the match, wherein the at least one link comprises a confidence value above a predetermined confidence threshold, and create an output group based on the at least one link, wherein at least two digital audio tracks belong to the output group if the at least one link exists between the at least two digital audio tracks.

BRIEF DESCRIPTION OF THE DRAWINGS

So that the above recited features and advantages of the inventive systems and methods can be understood in detail, a more particular description of the inventive systems and methods, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

FIG. 2 illustrates cross-correlation graphs of peak maps (see uppermost and middle graphs) and an overlap graph corresponding to delay (see bottommost graph) in an embodiment.

FIG. 3 illustrates a schematic diagram of a group of tracks, wherein each link has a delay $d_{ij}$ and a confidence in an embodiment.

FIG. 4. illustrates a graph showing a preferred layout of the group of tracks illustrated in FIG. 3, wherein the delays are represented as springs from one track to another track.

DETAILED DESCRIPTION OF THE DISCLOSURE

The present systems and/or methods comprise techniques and/or tools for chronologically ordering digital media and approximating a timeline of an event, wherein the digital media may be previously recorded by at least two digital mobile devices and the event may be associated with the recorded digital media. The techniques and/or tools utilized by the present systems and/or methods may be in the form of computer-implemented steps, algorithms and/or software that chronologically orders the digital media and approximates the timeline of the event when executed by one or more microprocessors associated with the present system and/or methods.

Figure 1:
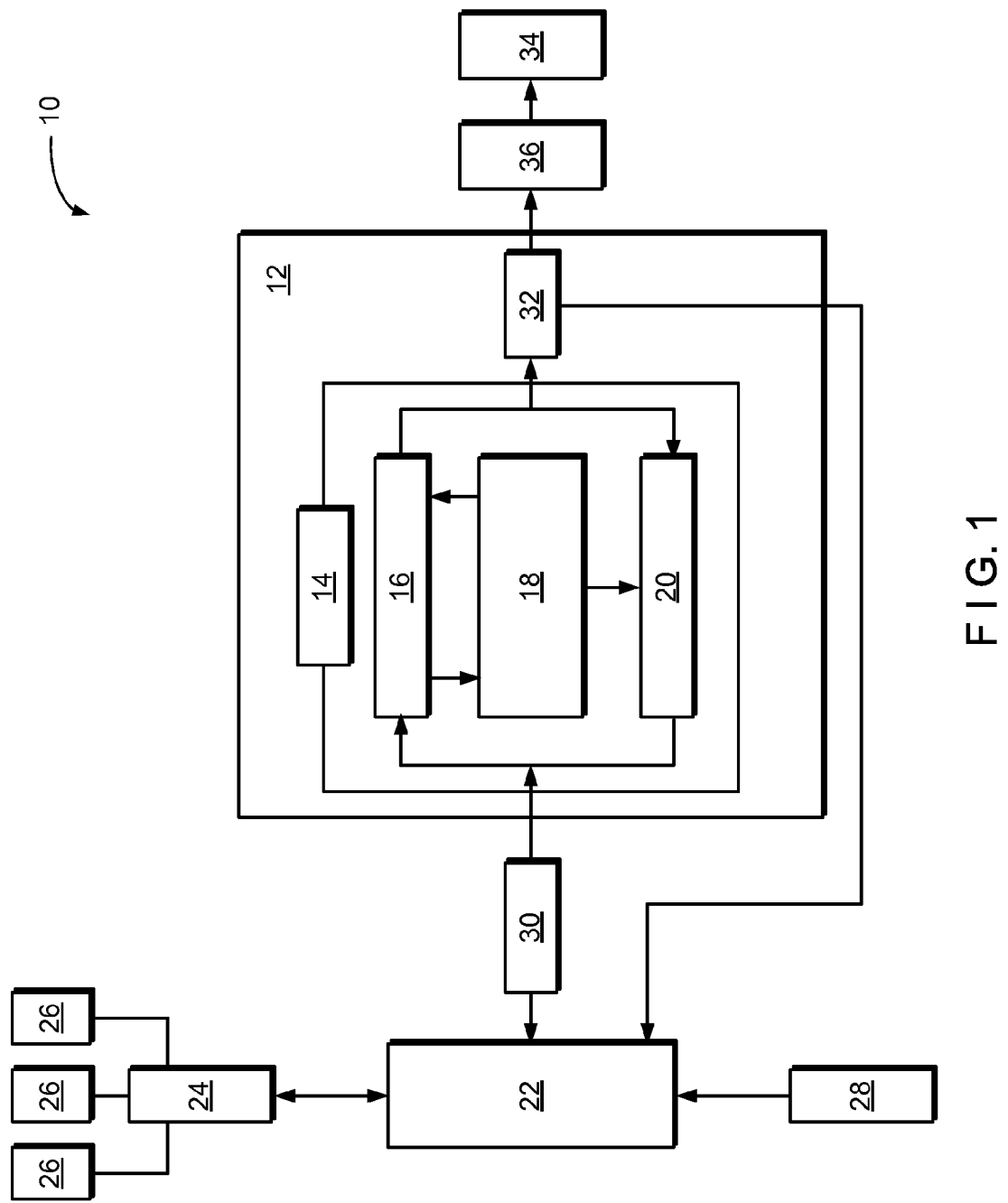
FIG. 1 illustrates a block diagram of a computer system for chronologically ordering digital media and approximating a timeline of an event associated with the digital media in an embodiment.

Referring now to the drawings wherein like numerals refer to like parts, FIG. 1 shows a computer system 10 (hereinafter "system 10") configured and/or adapted for chronologically ordering available digital media and approximating a timeline of an event that previously occurred which may be associated with the available digital media. The event may be, for example, a musical concert, an entertainment event, a political event, a sports event, a conference and/or the like. It should be understood that the present disclosure should not be deemed as limited to a specific embodiment of the event.

The system 10 comprises at least one computer terminal 12 (hereinafter "computer 12") which comprises at least one central processing unit 14 (hereinafter "CPU 14") having at least one control unit 16 (hereinafter "CU 16"), at least one arithmetic logic unit 18 (hereinafter "ALU 18") and at least one memory unit (hereinafter "MU 20"). One or more communication links and/or connections, illustrated by the arrowed lines within the CPU 14, allow or facilitate communication between the CU 16, ALU 18 and MU 20 of the CPU 14. One or more ordering and approximating computer-implemented methods, computer instructions, computer algorithms and/or computer software (hereinafter "ordering and approximating instructions") for chronologically ordering the available media and approximating the time line of the same event is uploaded and stored on a non-transitory storage medium (not shown in the drawings) associated with the MU 20 of the CPU 14 or a digital memory storage device associated with the computer 12 (not shown in the drawings).

The system 10 may further comprise a database server 22 (hereinafter "server 22") and a database 24 which may be local or remote with respect to the computer 12. The computer 12 may be connected to and in digital communication with the server 22 and/or the database 24, as illustrated by the arrowed lines extending between the computer 12 and the server 22 and between the server 22 and the database 24. In an embodiment not shown in the drawings, the server 22 may be excluded from the system 10 and the computer 12 may be connected to and in direct communication with the database 24. A plurality of digital media file and/or data files 26 (hereinafter "data files 26") are stored within the database 24 which are accessible by and transferable to the computer 12 via the server 22 or via a direct communication link (not shown in the drawings) between the computer 12 and the database 24 when the server 22 is excluded from the system 10.

The data files 26 stored in the database 24 comprise audio files, video files and/or multimedia files. The audio files comprise audio tracks, the video files comprise video tracks, and the audio and video tracks are recorded audio and video tracks of one or more portions of the same event that previously occurred. The one or more portions of the same event may be one or more durations of time that occurred between the begin and end of the same event. In embodiments, when the data files 26 are multimedia files, the multimedia files contain a combination of different content forms, such as, for example, recorded audio and video tracks. The audio and video tracks of the data files 26 are the original recorded audio and video signals recorded at or during the same event by the at least two different users via different digital mobile devices (i.e., from multiple sources). In embodiments, original recorded audio and video signals from multiple sources may have been accessed and/or uploaded, transferred to or transmitted to the system 10 via at least one digital input device 28 which may be connectible to the system 10 by a communication link or interface as illustrated by the arrowed line in FIG. 1 between server 22 and input device 28. In embodiments, the digital input device 28 may be an augmented reality device, a computer, a digital audio recorder, a digital camera, a handheld computing device, a laptop computer, a mobile computer, a notebook computer, a smart device, a table computer or a wearable computer or smart device. The present disclosure should not be deemed as limited to a specific embodiment of multimedia files and/or the input device 28.

In embodiments, the CPU 14 may access input audio tracks 30 which may be stored in and accessible from the database 24. In an embodiment, the CPU 14 may select the input audio tracks 30 from the data files 26 stored in the database 24. The CPU 14 may transmit a request for accessing the input audio tracks 30 to the server 22, and the server 22 may execute the request and transfer the input audio tracks 30 to the CPU 14 of the computer 12. The CPU 14 of the computer 12 may execute or initiate the ordering and approximating instructions stored on the non-transitory storage medium of MU 20 to perform, execute and/or complete one or more instructions, actions and/or steps associated the method 50 for chronologically ordering the input audio tracks 30 and approximating the time line of the event. As a result, the CPU 14 may extract features from the input audio tracks 30, estimate a delay and a confidence for pairs of recorded audio tracks from the input audio tracks 30, and create or output at least one group of recorded audio group 32 (hereinafter "output group 32"). As a result, each audio track of the output group 32 has a given offset inside the output group 32. Further, tracks of the output group 32 are synchronized and one or more portions of the same event are isolated by the inventive systems and methods. Alternatively, CPU 14, upon execution of the software, outputs at least one group of chunks of the audio and/or video tracks, whereby each chunk has a given offset inside the group of chunks. Additional instructions, actions or steps that are performable or executable by the CPU 14 and ordering and approximating instructions are subsequently discussed with respect to the method 50 for chronologically ordering the input audio tracks 30 and approximating the time line of the same event.

After the output group 32 or at least one group of chunks is created by the CPU 12, the output group 32 may be transferred or transmitted to the server 22 which may store the output group 32. Alternatively, the output group 32 may be transferred to a memory 34 associated with the computer 12 via communication link 36 that may connect the CPU 14 and the memory 34 such that the CPU 14 may be in communication with the memory 34. The memory 34 may be local or remote with respect to the computer 12. In embodiments, the computer 12, the server 22, the database 24 and/or the memory 34 may be connected and/or in communication with one another via a digital communication network (not shown in the drawings) which may be a wireless network or a wired network and/or combinations thereof. The digital communication network may be any digital communication network as known to one of ordinary skill in the art.

Figure 5:
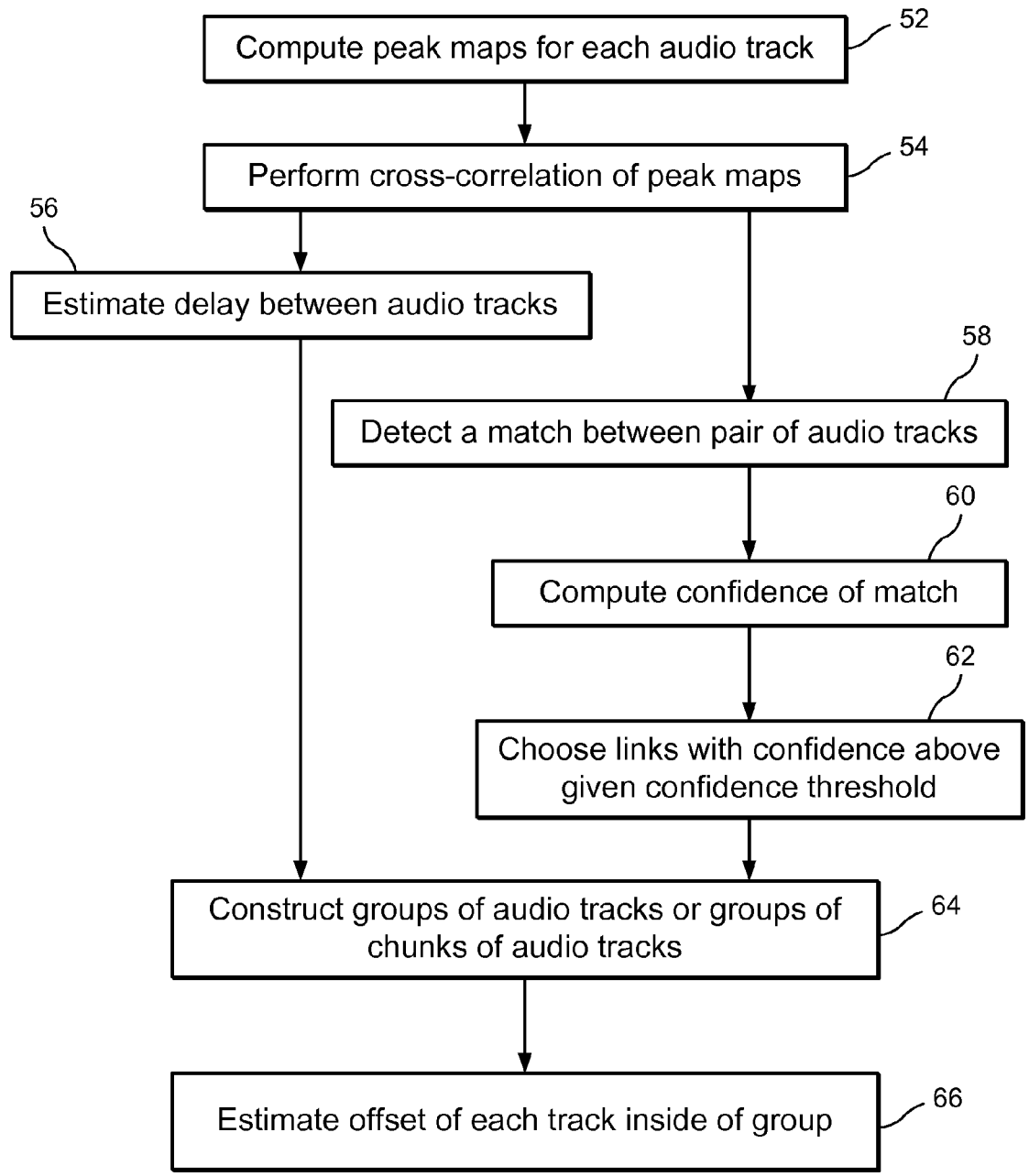
FIG. 5 illustrates a flowchart of a computer-implemented method for chronologically ordering digital media and approximating a timeline of an event associated with the digital media in an embodiment

Upon execution of the ordering and approximating instructions by the CPU 14, the system 10 performs, completes or executes an inventive method 50 for synchronizing recorded audio tracks from multiple sources as shown in FIG. 5. The method 50 utilizes the input audio tracks 30 as a list of original recorded audio tracks from or associated with the original recorded videos that were recorded from multiple sources at the same event. The method 50 comprises at least extracting features from the input audio tracks 30, estimating a delay and a confidence for each pair of tracks of the input audio tracks 30, and creating the output group 32 (i.e., one or more groups of tracks or chunks of tracks).

To extract at least one feature from each audio track of the input audio tracks 30, the inventive method computes peak maps of each audio track and/or a spectrogram of each audio track as shown at step 52. For example, the method 50 may use a sampling frequency of 8000 Hz and a window of 512 samples with 50% overlap, which yields time frames of 32 ms with k=256 frequency bins.

In an embodiment, the method 50 may then search for local maxima in order to construct a binary spectrogram (i.e., peak map) that equals 1 at a local maximum and 0 elsewhere. These peak maps constitute the fingerprint of each audio track. To find the local maxima with Matlab, the method 50 may utilize, for example, the function imdilate (image, mask) that efficiently finds a maximum value of a region around each pixel defined by mask. Additionally, an elliptic mask of width 31 time frames (1 s) and height 13 frequency bins (400 Hz) may be utilized by the method 50. Moreover, the method 50 may count time in terms of frames, and not in terms of seconds, to comply a time resolution defined by the spectrogram.

Next, the method 50 performs a spectrogram cross-correlation as shown at step 54. After the peak maps are computed, one or more of the audio tracks may be matched to each other. The method 50 performs a cross-correlation of the peak maps as shown in FIG. 2. During the cross-correlation of the peak maps, the method 50 treats each frequency separately. The uppermost and middle graphs of FIG. 2 illustrate the cross-correlation of the peak maps and the bottommost graph of FIG. 2 illustrates overlap corresponding to delay between the audio tracks. For each corresponding delay between the audio tracks, the cross-correlation provides or gives the number of matching peaks. Then, the delay is estimated as the time difference between audio tracks that received the maximum value in the cross-correlation of the peak maps as shown at step 56.

Further, the method 50 may detect a match between a pair of audio tracks as shown at step 58. The confidence of said match is computed according to equation (1):

$$\text{confidence} = \frac{M}{M^*} \qquad (1)$$

where M is the maximum value obtained during the cross-correlation of binary spectrograms as shown at step 60. The computation of M* is explained hereafter.

For each pair of audio tracks, a M* is estimated. A value of M* represents the expected maximum of the cross-correlation if both audio tracks were completely decorrelated and only depends of their lengths $L_1$, $L_2$ and $L_{min}=\min(L_1, L_2)$.

Given an average density D of peaks per frame and a number of frequency bins k, the method 50 estimates a probability p of a match to occur on an overlap of 1 sample. For two uniformly random binary spectrograms of D peaks per frame, the probability p for a time-frequency pair to equal 1 is then $$\frac{D}{k}.$$

The probability p for both binary spectrogram to match on the same time-frequency pair is computed according to equation (2)

$$p = \frac{D^2}{k^2} \qquad (2)$$

In other words, for a time-frequency pair, a match follows a Bernoulli distribution of success probability p and its variance is p (1−p).

On an overlap of L frames, with k frequency bins, there are k·L time frequency-pairs; so with the hypothesis that matches are independent, according to the central limit theorem the number of matches follows a normal distribution $N(\mu, \sigma^2)$ of parameters according to equation (3):

$$\begin{cases} \mu = p \cdot k \cdot L \\ \sigma^2 = p(1-p) \cdot k \cdot L \end{cases} \qquad (3)$$

During the cross-correlation of peak maps, each delay between both peak maps represents a certain overlap of L frames as shown in FIG. 2. Moreover, for each delay, the number of matches follows a normal distribution $N(\mu, \sigma^2)$, with $\mu$ and $\sigma^2$ depending of L.

A good approximation for the maximum $M_n^*$ of n independent and identically distributed gaussian random variables N (0, 1) is given by equations (4) and (5):

$$M_n^*(0,1) = \sqrt{\ln\left(\frac{n^2}{2\pi\ln\left(\frac{n^2}{2\pi}\right)}\right)}\left(1 + \frac{\gamma}{\ln n} + o\left(\frac{1}{\ln n}\right)\right) \qquad (4)$$

which gives for $N(\mu, \sigma^2)$:

$$M_n^*(\mu, \sigma^2) = \mu + \sigma M_n^*(0,1) \qquad (5)$$

In order to utilize equation (5), the random variables need to be identically distributed, however $\mu$ and $\sigma^2$ depend of the overlap L. To solve this, the method 50 treats smaller ($L<L_{min}$) overlaps as others and sums up the problem as L1+L2 overlaps of $L=L_{min}$ frames as shown in equation (6):

$$M^* = M^*_{L_1+L_2}(\mu, \sigma^2) \qquad (6)$$

M* is subsequently utilized as a lower bound to discard unsure matches. As a result, the approximation of equation (6) provides an improved and safer detection. In an embodiment, the approximation of $L<L_{min}$ may enable estimation of M* and/or production of equation (6).

In embodiments, a maximum of the cross-correlation for the delay may not necessarily correspond to the number of matches in the biggest chunk and sub-frame accuracy may be utilized in order to take into account matches that occurred for best delay±1.

When execution of the software results in outputting groups of chunks of the audio tracks, the method 50 focuses on locating exactly where the match occurred, the method 50 saves an interval [a, b] where a and b are begin and end frames of the match, relatively to the first track.

This interval [a, b] is the largest region with an average density of matches above a threshold, the threshold being defined with regards to parameters $\mu$ and $\sigma2$ to account or adjust for noise in matches.

The method 50 detects a list of links between the audio tracks, whereby each link is defined (i) as a delay and a confidence when groups of tracks are outputted or (ii) a delay, a confidence and match bounds when groups of chunks of the audio tracks are outputted.

The method 50 chooses links with confidence above a given confidence threshold as shown at step 62. For example, a link with a confidence of 1 is a very poor match (at noise level) which is discarded, when the confidence threshold may be about 6.

After links with confidence above the given confidence threshold are selected by the method 50, the groups may be constructed as shown at step 64. The method 50 applies the following rule to construct the groups: two tracks belong to a same group if a link exists between the two tracks. A group may then be represented as a graph, with the two tracks as nodes and links as edges as shown in FIG. 3, wherein each link has a delay $d_{ij}$ and a confidence $c_{ij}$. When groups of chunks of the audio tracks are outputted, the matches are restricted to specific domains or chunks of the audio tracks and the following rule is applied to construct groups of chunks: two chunks belong to a same group if a links exists between the two chunks or if the two chunks contain a same portion of the same file.

After method 50 constructs the one or more groups of tracks or chunks of tracks, the offset $x_i$ of each track inside the group is estimated as shown at step 66. The offset $x_i$, of each track inside the group may be estimated by building the best layout of each group as shown in FIG. 4 whereby delays are represented as springs from one track to another track.

Delays contained in the links could be propagated in order to position tracks relatively to each other inside the group. However, such approach presents at least two flaws:

1. When working at the resolution determined by the length of 1 frame (i.e., 32 ms). By propagating delays from track to track, the error of each delay is also propagated, which can result in a lack of precision in the position of tracks, and in inconsistencies with other delays. Moreover, the final layout depends on the order in which links are processed; and
2. Wrong matches are sometime noticed within, for example, a same song of a same concert, usually between different choruses and with a potentially high confidence. This approach is not able to detect and treat these chorus matches.

Thus, the inventive system 10 and method may, in an embodiment, execute a force-based algorithm to estimate the offsets which utilizes a physical modeling (see D. Vrajitoru and J. Deboni, "Consistent graph layout for weighted graphs," *The 3rd ACS/IEEE International Conference on Computer Systems and Applications*, 2005, pages 23-30). Each link is represented by a spring, the equilibrium length being the delay previously computed, and the spring being directed with regards to the sign of the delay as shown in FIG. 4. That is, for two tracks i and j a force is introduce according to equation (7):

$$\vec{F_{i \to j}} = (x_j - (x_i + d_{ij}))\vec{\mu_{ij}} \tag{7}$$

All tracks are first positioned at a time origin. Then, at each iteration, each track is moved by a small offset, proportional to the sum of all spring forces applied to it. The algorithm stops when the sum of all forces falls below a given threshold.

As a result, the first flaw described above is solved. In the case of, for example, chorus matches, if there are more correct matches than chorus matches, the correct springs tend the offsets towards the correct layout. However, a result is usually a layout where neither the correct nor the wrong matches are respected.

Despite yielding quite satisfactory results, another flaw of this approach may be a high number of iterations before reaching equilibrium. For example, the closer the situation gets to the equilibrium, the smaller the forces get and the slower the tracks will move for later iterations. Moreover, the choice of the coefficient to apply to the forces at each iteration may be difficult. For example, too small may make the run very slow, while too high may make the model diverge.

When groups of chunks of audio tracks are outputted, links are defined only on a certain domain of the tracks, the method 50 merges the chunks containing portions of the same file, and then applies, to each merged portion, the sum of all forces applied to the chunks it is made of.

Apart from being quite slow, one reason why the force-based algorithm may fail to treat chorus matches may be because the force-based algorithm intends to minimize the sum of the errors $x_j-(xi+dij)$ and not their L1 norm $\Sigma_{ij}|x_j(x_i+dij)|$. Indeed, minimizing a L1 norm is supposed to force most coefficients to zero.

As a result, the following LP problem according to equation (8) may be presented:

$$\text{Find } x_1, \ldots, x_n \text{ that minimize} \sum_{i,j} |x_j - (x_i + d_{ij})| \tag{8}$$

Note that to do so, the slack variables $\epsilon_{ij} \geq |x_j-(x_i+d_{ij})|$ must be defined The problem with respect to one chorus match against a majority of correct matches is solved. However, it may yield wrong results with a high number of chorus matches.

In an embodiment, the modeling of forces of equations (7) may be similar to the LP problem defined in equation (8). However, the force-based algorithm tends to minimize the sum errors, while the LP problem tends to minimize the sum of ABSOLUTE VALUES of errors which is a better or more desirable outcome. Therefore, in an embodiment, the system 10 and/or method 50 may execute the LP problem and not the force-based algorithm.

In an embodiment, a constraint solver, such as, for example, Cassowary may prevent a wrong result when a chorus match verses a correct match.

In other embodiments, the inventive system 10 and method 50 may also weight each absolute value of the error $|x_j-(x_i+d_{ij})|$ by its confidence $c_{ij}$ in the objective to minimize defined in equation (8). This may allow to advantage true matches against chorus matches in the construction of the group layout. As a result, the approach then resembles utilization of a Cassowary constraint solver, where each constraint may be weighted.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

The invention claimed is:

1. A method for synchronizing at least one track selected from digital audio tracks and digital video tracks recorded at a same event, the method comprising:
   accessing input digital audio tracks that are storable in a database, wherein the input digital audio tracks comprise a list of original recorded digital audio tracks from original recorded digital videos that were recorded from multiple digital sources at the same event;
   extracting at least one feature from each digital audio track of the input digital audio tracks,
   constructing, based on the at least one feature, a peak map for each digital audio track of the input digital audio tracks;
   performing a cross-correlation of the peak maps of the digital audio tracks of the input digital audio tracks;
   estimating a delay between at least one pair of digital audio tracks of the input digital audio tracks, wherein the delay comprises a time difference between the at least one pair of digital audio tracks that received a maximum value in the cross-correlation of the peak maps; and
   creating an output group comprising the at least one pair of digital audio tracks, wherein each digital audio tracks of the output group has an offset inside the output group.

2. The method according to claim 1, wherein each digital audio tracks of the output group is synchronized such that at least one portion of the same event is isolated by the output group.

3. The method according to claim 1, further comprising: providing a database, wherein the input digital audio tracks are stored within the database.

4. The method according to claim 1, further comprising: storing the output group within a digital memory device.

5. The method according to claim 1, wherein the output group is a group of chunks of digital audio and/or video tracks, whereby each chunk has a given offset inside the group of chunks.

6. The method according to claim 1, wherein each peak map is constructed by searching each digital audio track for a local maxima to construct a binary spectrogram that equals 1 at a local maximum and 0 elsewhere.

7. The method according to claim 6, further comprising: determining the local maxima by utilizing a function imdilate, comprising an image and a mask, that determines a maximum value of a region around each pixel defined by the mask.

8. The method according to claim 7, wherein the mask is an elliptic mask.

9. A method for synchronizing at least one track selected from digital audio tracks and digital video tracks recorded at a same event, the method comprising:
   accessing input digital audio tracks that are storable in a database, wherein the input digital audio tracks comprise a list of original recorded digital audio tracks from original recorded digital videos that were recorded from multiple digital sources at the same event;
   extracting at least one feature from each digital audio track of the input digital audio tracks,
   constructing, based on the at least one feature, a peak map for each digital audio track of the input digital audio tracks;
   detecting a match between at least two digital audio tracks by performing a cross-correlation of the peak maps of the digital audio tracks of the input digital audio tracks;
   computing a confidence value of the match;
   selecting at least one link between the at least two digital audio tracks of the match, wherein the at least one link comprises a confidence value above a predetermined confidence threshold; and
   creating an output group based on the at least one link, wherein at least two digital audio tracks belong to the output group if the at least one link exists between the at least two digital audio tracks.

10. The method according to claim 9, wherein the at least two digital audio tracks of the output group are synchronized such that at least one portion of the same event is isolated by the output group.

11. The method according to claim 9, further comprising: providing a database, wherein the input digital audio tracks are stored within the database.

12. The method according to claim 9, further comprising: storing the output group within a digital memory device.

13. The method according to claim 9, further comprising: utilizing equation (1) to compute the confidence of the match, $$\text{confidence} = M/M^* \tag{1},$$

wherein M is a maximum value obtained during the cross-correlation and $M^*$ is an estimate representing an expected maximum of the cross-correlation if the at least two digital audio tracks of the match were decorrelated and the lengths of the at least two digital audio tracks of the match.

14. The method according to claim 13, further comprising: discarding links between at least two digital audio tracks having a confidence value below the predetermined confidence threshold, wherein, optionally, the predetermined confidence threshold is about 6.

15. The method according to claim 9, further comprising: detecting a list of links between the digital audio tracks, wherein each link is defined (i) as a delay and a confidence when groups of digital audio tracks are outputted or (ii) a delay, a confidence and match bounds when groups of chunks of the digital audio tracks are outputted.

16. A non-transitory computer-readable medium with instructions stored thereon, that when executed by a microprocessor, perform a method for synchronizing at least one track selected from digital audio tracks and digital video tracks recorded at a same event, the method comprising:
   accessing input digital audio tracks that are storable in a database, wherein the input digital audio tracks comprise a list of original recorded digital audio tracks from original recorded digital videos that were recorded from multiple digital sources at the same event;
   extracting at least one feature from each digital audio track of the input digital audio tracks,
   constructing, based on the at least one feature, a peak map for each digital audio track of the input digital audio tracks;
   detecting a match between at least two digital audio tracks by performing a cross-correlation of the peak maps of the digital audio tracks of the input digital audio tracks and/or estimating a delay between at least one pair of digital audio tracks of the input digital audio tracks, wherein the delay comprises a time difference between the at least one pair of digital audio tracks that received a maximum value in the cross-correlation of the peak maps; and
   creating an output group comprising the at least two digital audio tracks and/or the at least one pair of digital audio tracks.

17. The non-transitory computer-readable medium according to claim 16, wherein the at least two digital audio tracks or the at least one pair of digital audio tracks of the output group are synchronized such that at least one portion of the same event is isolated by the output group.

18. The non-transitory computer-readable medium according to claim 16, further comprising:
   providing a database, wherein the input digital audio tracks are stored within the database.

19. The non-transitory computer-readable medium according to claim 16, further comprising:
   storing the output group within a digital memory device.

20. The non-transitory computer-readable medium according to claim 16, further comprising:
   computing, after the match is detected, a confidence value of the match;
   selecting at least one link between the at least two digital audio tracks of the match, wherein the at least one link comprises a confidence value above a predetermined confidence threshold; and
   creating an output group based on the at least one link, wherein at least two digital audio tracks belong to the output group if the at least one link exists between the at least two digital audio tracks.

* * * * *